UNITED STATES PATENT OFFICE 2,416,203

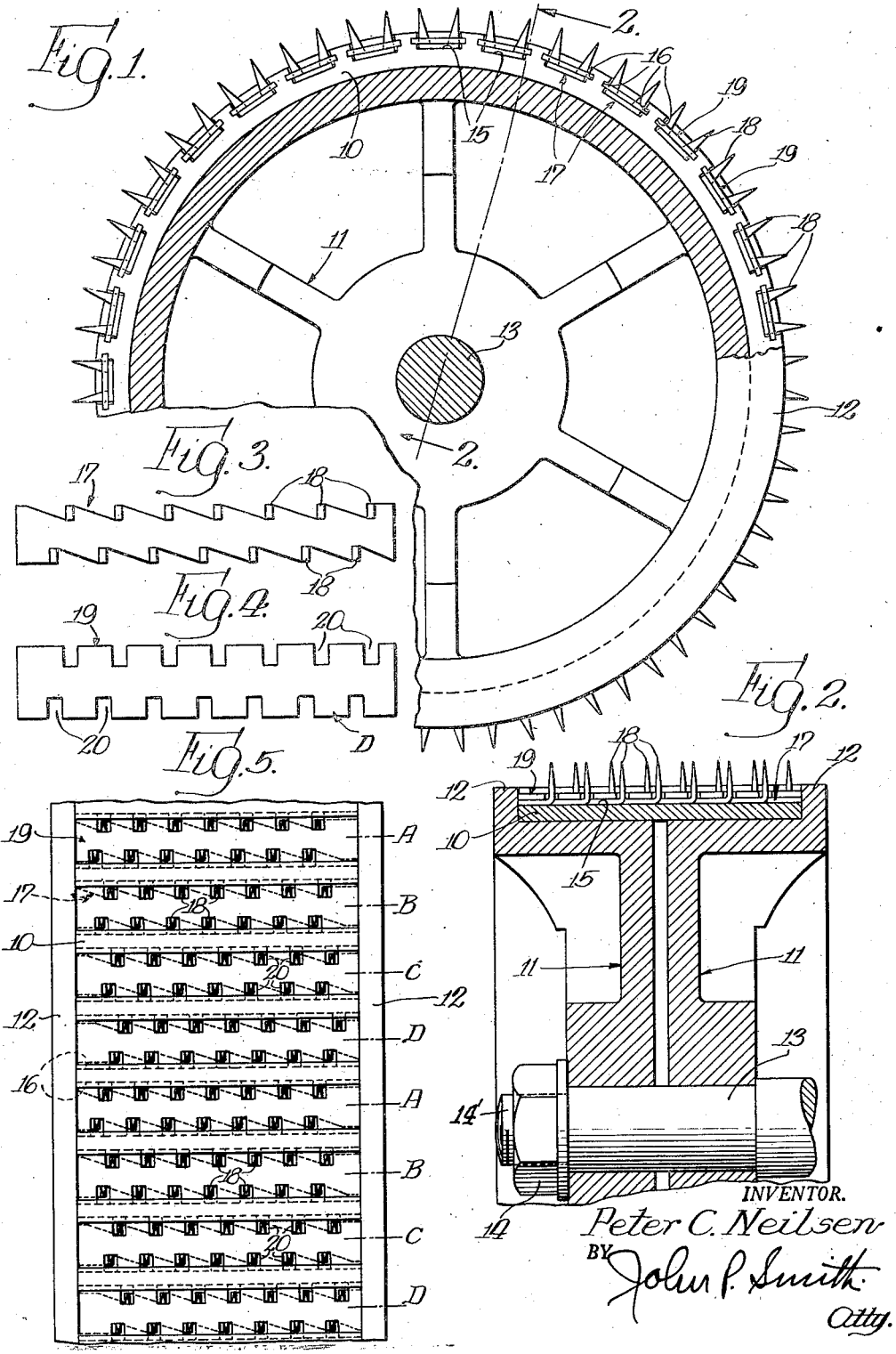

TIRE RASP

Peter C. Neilsen, Chicago, Ill.

Application October 27, 1944, Serial No. 560,652

7 Claims. (Cl. 29—78)

The present invention relates generally to a novel and improved construction of rasp for excorticating tires in the removal of tread material from the tire casing preparatory to retreading or recapping as well as other uses to which the invention may be put.

The primary object of the present invention is to provide a novel and improved tire rasp of the rotatable type having embodied therein a simple, economical and practical arrangement and construction which will permit and simplify the replacement of worn out abrading prongs with the minimum time and effort.

A further object of the invention is to provide a novel and improved construction of an abrading drum whereby the drum is provided with a plurality of peripherally arranged transverse recesses for the reception of quickly detachable abrading units in which each unit carries a plurality of abrading prongs formed integrally from a single strip of steel.

A further object of the invention is to provide a novel and improved gauge or rasp unit supporting member in combination with my tire abrading drum so as to properly position the abrading prongs of each unit so that they will be arranged in staggered or spiral relation around the periphery or drum of the abrading wheel.

These and other objects are accomplished by providing a construction and an arrangement of the various parts in the manner hereinafter described and particularly pointed out in the appended claims.

Referring to the drawing:

Fig. 1 is a side elevational view partly in cross section showing the construction of my improved tire rasp;

Fig. 2 is a fragmentary cross sectional view taken on the line 2—2 in Fig. 1;

Fig. 3 is a top plan view of one of the rasp units;

Fig. 4 is a top plan view of one of the gauges and unit holders for properly positioning and securing the unit in place on the drum; and Fig. 5 is a top plan view showing a portion of the periphery of the tire rasp opened up on a flat surface.

In illustrating one form of my invention I have shown the same as comprising an annular band or drum 10. This annular band is adapted to be supported on and clamped between oppositely facing and slightly spaced apart hub members, generally indicated by the reference character 11. One of the edges of each of these hub members 11 is provided with a radially projecting flange 12 on the periphery thereof. These flanges 12 are adapted to project slightly beyond the periphery of the band 10 and when the two opposed hub members 11 are drawn together, they will clamp the band 10 therebetween as clearly shown in Fig. 2 of the drawing. The hub members 11 may be suitably clamped on a shouldered shaft, as shown at 13, by means of a nut 14 mounted in threaded engagement with a threaded outer end portion 14' of the shaft.

The primary novel feature of the present invention involves the manner in which the worn out prongs may be renewed and new ones replaced in the form of units so as to simplify the operation and expedite the substitution of a new unit for a replaced one. This construction includes a plurality of transverse slots or recesses 15 located at uniform spacing throughout the periphery of the band or drum 10. Located in the side walls of these transverse slots or recesses 15 are oppositely projecting rectangular transverse recesses or under-cuts 16. Adapted to be removably mounted in each of the transverse recesses 15 are removable rasping units, generally indicated by the reference character 17. These rasping units 17 carry a plurality of abrading or rasping prongs 18 formed integrally with and located on the opposite longitudinal edges of the main body of the unit 17. The abrading units 17 throughout the periphery of the tire rasp are identical in form and the prongs and main body portions of the units are preferably made from a single piece of flat or bar steel in which the prongs 18 thereof are sheared and bent along the opposite longitudinal edges of the stock and arranged so that the prongs on the opposite edges thereof are staggered with respect to each other. Each of these rasp units 17 is located and secured in the bottom of each of the recesses 15 of the band 10 by a gauge or supporting member, generally indicated by the reference character 19. These members 19 are made from a rectangular blank or bar of steel and are provided with a plurality of rectangular slots, notches or recesses 20 located in the opposite longitudinal edges thereof. The recesses 20 on one edge of the member 19 are offset with respect to the recesses on the other edge thereof so as to be complementary to and adapted to embrace the projecting prongs 18 of each of the rasp units 17. When the gauge member 19 is placed over the top of the unit 17 so that it rests upon the main body portion of the rasp unit 17, the unit and gauge member 19 may then be inserted from one side of the drum so that the outer edges of the gauge member 19 enter and engage the rectangular slots 16 on the opposite side walls of the recess 15, while the unit 17 slides into and is seated in the bottom of the recess 15, in the manner clearly shown in Figs. 1 and 2 of the drawing.

As hereinbefore stated, all of the rasping units 17 are identical, but the supporting members 19 have a series of varying lengths from the outer recesses 20 to the ends of the gauge member 19. This arrangement effects an offset of the prongs of each successive unit throughout the periphery of the drum. In other words, by employing the plates 19 in the successive order A, B, C, and D, the prongs of each successive unit will be staggered or spiraled in relation about the periphery of the drum in the manner indicated in Fig. 5 of the drawing.

Summarizing the advantages and manner of operation of my improved tire rasp and especially the facility and ease with which the rasping prong units are replaced for worn out ones, it will be obvious that if an operator is desirous of removing the rasp units 17 from the drum 10, it is only necessary to remove the nut 14 and the outer hub member 11, and then slide each worn out unit 17 with its accompanying gauge 19 longitudinally out of the slot 15, replace the worn out unit 17 with the old gauge member 19 and by such successive operations, the complete band or drum is replaced with new rasp units 17 throughout the periphery thereof. The drum is then secured in place by replacing the outer hub member 11 on the shaft and replacing and securing the nut 14 on the threaded portion of the shaft 13 to clamp the drum 10 and units together in the manner clearly disclosed in Figs. 1 and 2 of the drawing. This arrangement of having a replaceable rasp unit in the form of a piece or strip or bar of steel in which a plurality of abrading prongs are formed integrally therewith and have the same removable from the drum saves considerable time and expense over the methods heretofore used. In this connection it will also be noted that the cost of producing the replaceable units is far less than heretofore required to replace the equivalent number of tacks or nails heretofore used with the conventional tire rasp. It is also pointed out that the time consumed to make the change or replacement in the present invention is reduced to a minimum.

While in the above specification I have described one embodiment which my invention may assume in practice, it will of course be understood that the same is capable of modification and that modification may be made without departing from the spirit and scope of the present invention as expressed in the following claims.

What I claim as my invention and desire to secure by Letters Patent is:

1. A tire rasp comprising an annular member having a plurality of transversely arranged and spaced apart recesses in the periphery thereof, rasp units having abrading prongs formed integrally therewith mounted in said recesses, there being opposed recesses in the opposite walls of each of said first named recesses, supporting plates complementary to said rasp units and engageable with said last named recesses for detachably positioning said units on said member, a shaft for said member, and hub members mounted on said shaft for supporting and clamping said annular member therebetween and for retaining said units and plates on said annular member.

2. A tire rasp comprising an annular member having a plurality of transversely arranged and spaced apart recesses in the periphery thereof, rasp units having abrading prongs formed integrally therewith mounted in said recesses, there being opposed recesses in the opposite walls of each of said first named recesses, supporting plates complementary to said rasp units and engageable with said last named recesses for detachably positioning said units on said member, a shaft for said member, normally spaced apart members mounted on said shaft for supporting said annular member, radially projecting peripheral flanges formed on said hub members for engaging the outer edges of said annular member and for retaining said rasp units and plates in position on said annular member.

3. A tire rasp comprising an annular member having a plurality of transversely arranged and spaced apart recesses in the periphery thereof, rasp units having abrading prongs formed integrally therewith mounted in said recesses, there being opposed recesses in the opposite walls of each of said first named recesses, supporting plates complementary to said rasp units and engageable with said last named recesses for detachably positioning said units on said member, a shaft for said member, clamping members mounted on said shaft and engageable with the outer edges of said annular member for retaining said rasp units and plates in position on said annular member.

4. A tire rasp comprising an annular drum having a plurality of transversely arranged and spaced apart recesses in the periphery thereof, rasp units in the form of flat strips of steel having a plurality of abrading prongs formed integrally therewith and projecting at right angles from the main body portion thereof mounted in said recesses, and plates having notches complementary to the prongs of said units and engageable with the recesses in said drum for retaining said units in said drum.

5. A tire rasp comprising an annular drum having a plurality of transversely arranged and spaced apart recesses in the periphery thereof, rasp units in the form of flat strips of steel having a plurality of abrading prongs formed integrally therewith and projecting at right angles from the main body portion thereof mounted in said recesses, and plates having notches complementary to the prongs of said units and engageable with the recesses in said drum for retaining said units in said drum, the complementary notches of said plates located at varying distances from the ends thereof whereby the prongs of said units are spirally arranged about the periphery of said drum.

6. A tire rasp comprising an annular drum having a plurality of transversely arranged and spaced apart recesses in the periphery thereof, rasp units in the form of flat strips of steel having a plurality of abrading prongs formed integrally therewith and projecting at right angles from the main body portion thereof mounted in said recesses, and a series of plates having notches complementary to said prongs for securing said units in the recesses of said drum whereby said plates may be successively arranged in order to spirally align said prongs on the periphery of said drum.

7. A tire rasp comprising an annular drum having a plurality of transversely arranged and spaced apart recesses in the periphery thereof, rasp units in the form of flat strips of steel having a plurality of abrading prongs formed integrally therewith and projecting at right angles from the main body portion thereof mounted in said recesses, plates having notches complementary to the prongs on said units and engageable with the recesses in said drum, certain of said plates having the notches thereof located at different distances from the ends thereof whereby the prongs of successive units are staggered about the periphery of said drum, and means for securing said units in said drum.

PETER C. NEILSEN.

REFERENCES CITED

The following references are of record in the file of this patent:

UNITED STATES PATENTS

| Number | Name | Date |
| --- | --- | --- |
| 2,035,802 | George | Mar. 31, 1936 |
| 2,058,229 | Hodgkins | Oct. 20, 1936 |
| 2,079,995 | Hodgkins | May 11, 1937 |
| 2,205,343 | Carelli | June 18, 1940 |
| 558,855 | Stauder | Apr. 21, 1896 |